April 10, 1928.  1,665,850
W. HARGREAVES
SAFETY VALVE
Filed March 16, 1927   6 Sheets-Sheet 1
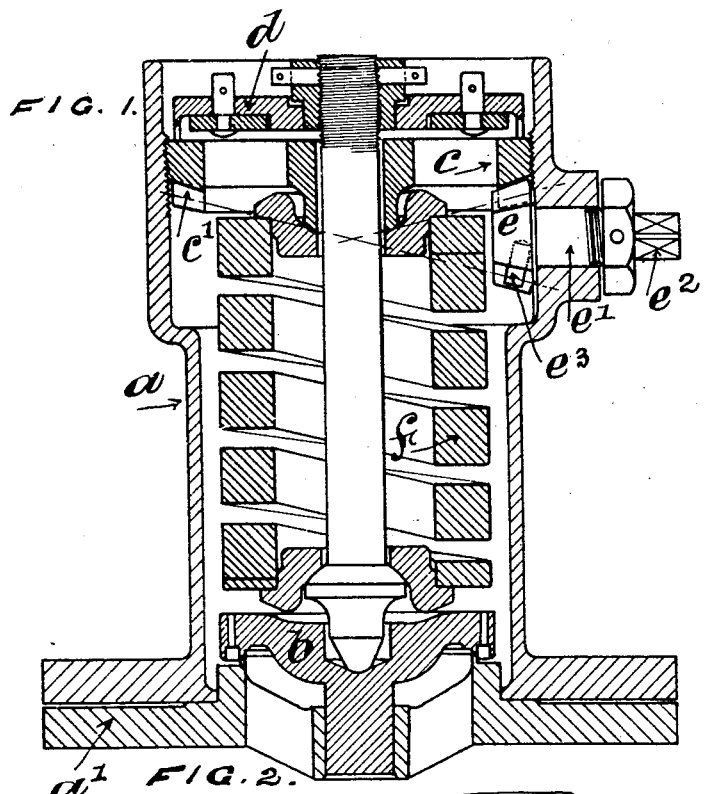
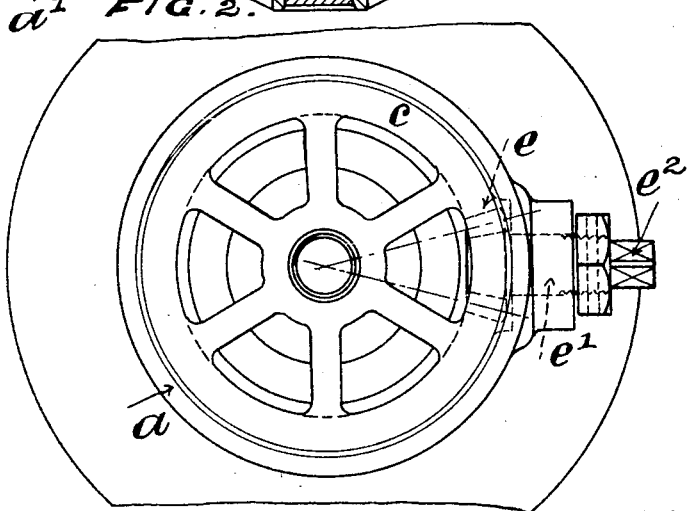
INVENTOR:
William Hargreaves
BY: Rungs, Boyer & Bakelew
ATTORNEYS.

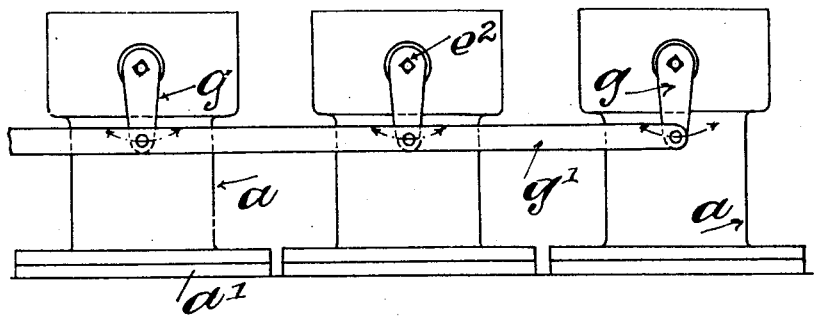
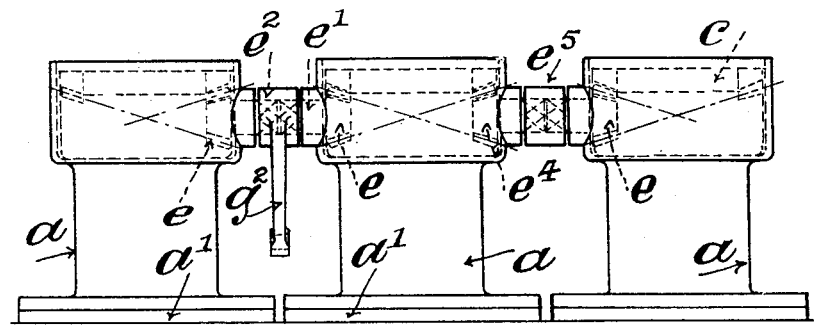

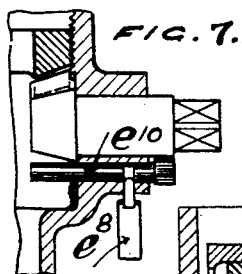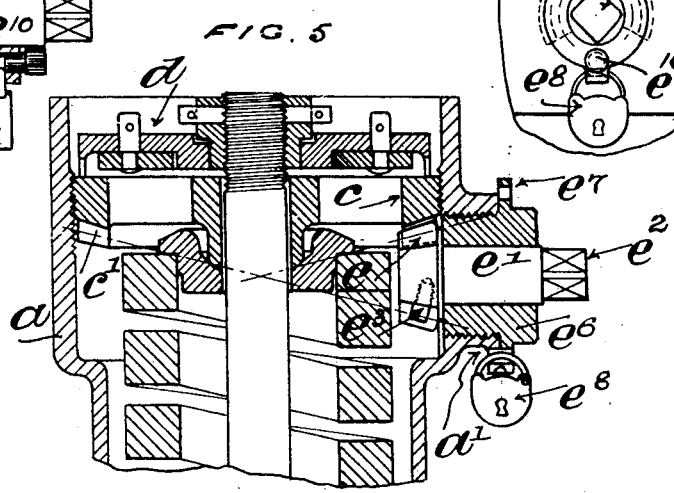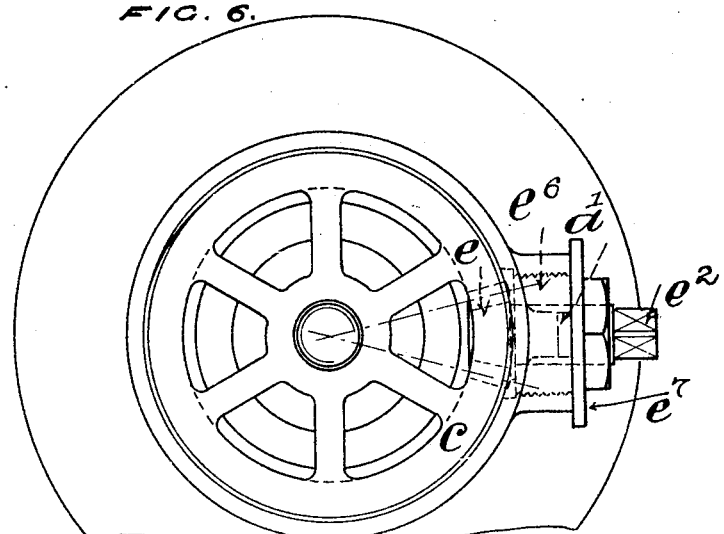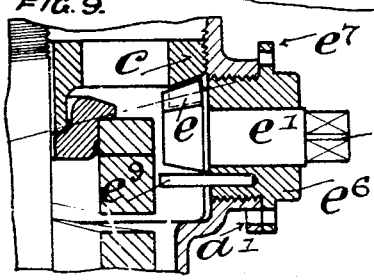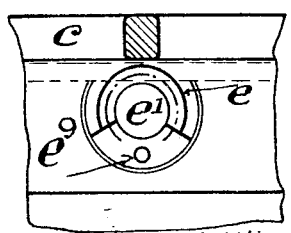

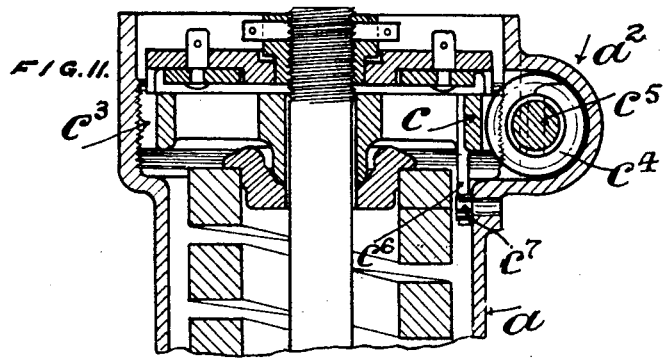
FIG.11.
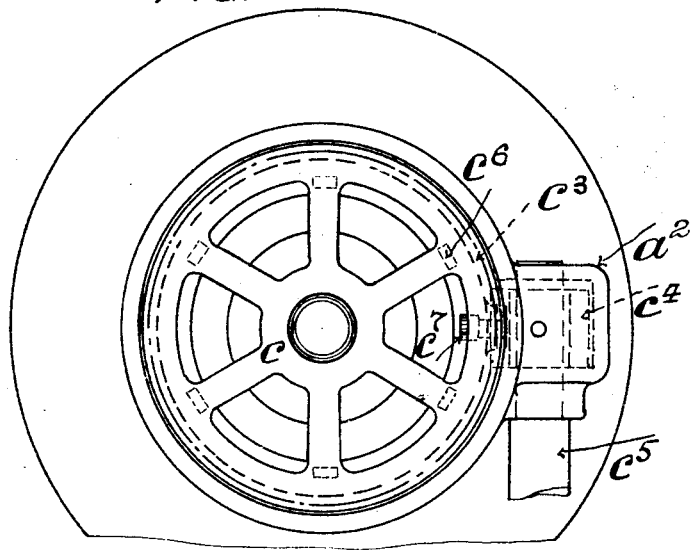
FIG.12.
FIG.13.
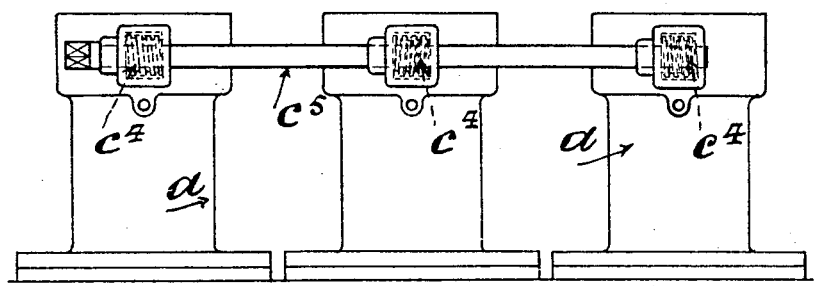
INVENTOR:
William Hargreaves
BY: Reep, Bayn & Bakeler
ATTORNEYS.

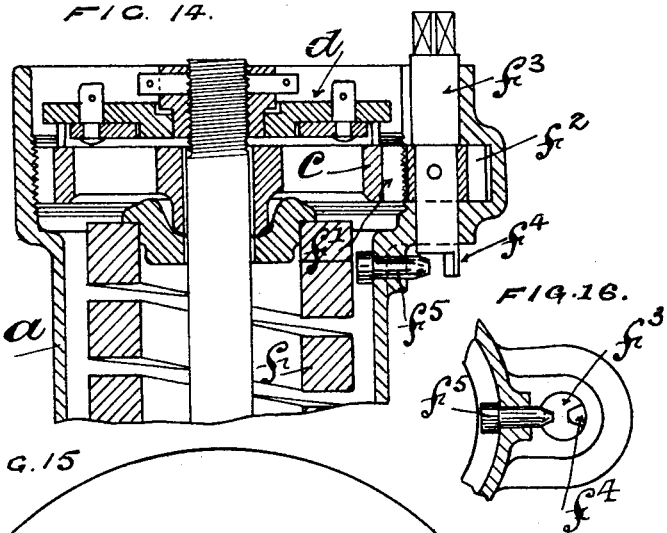
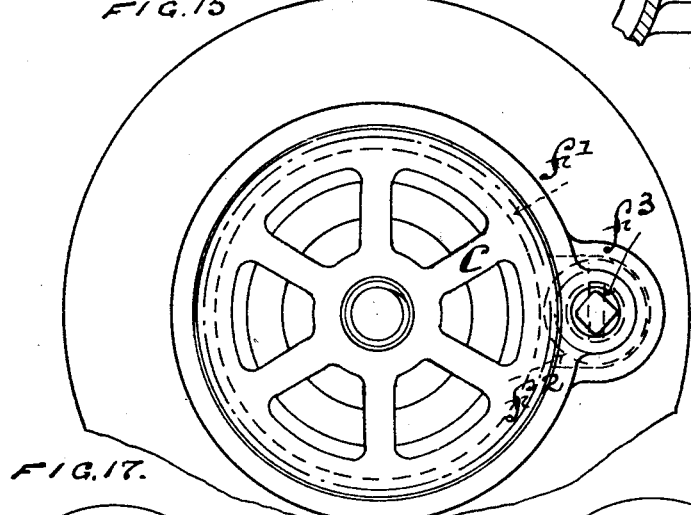
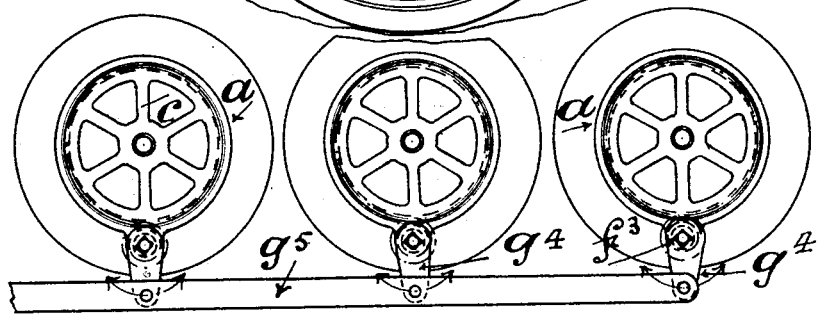

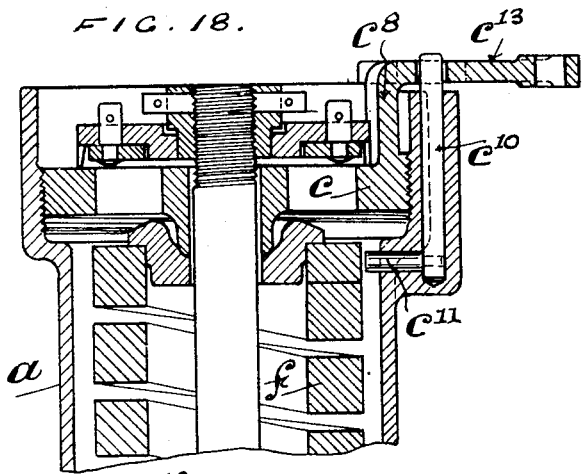
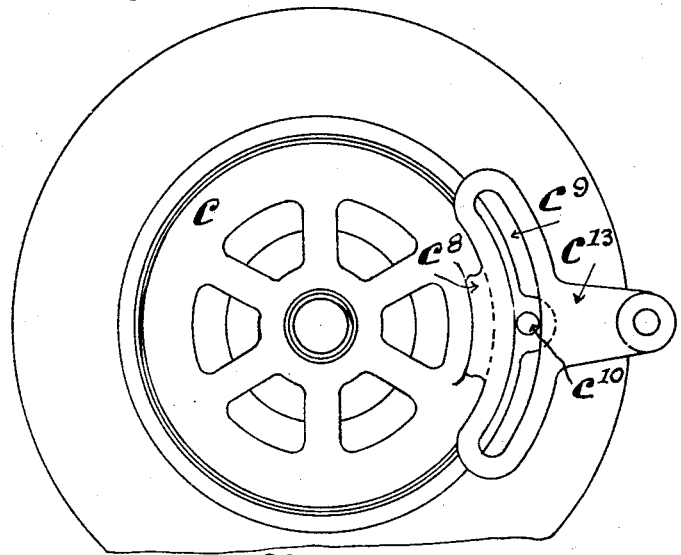
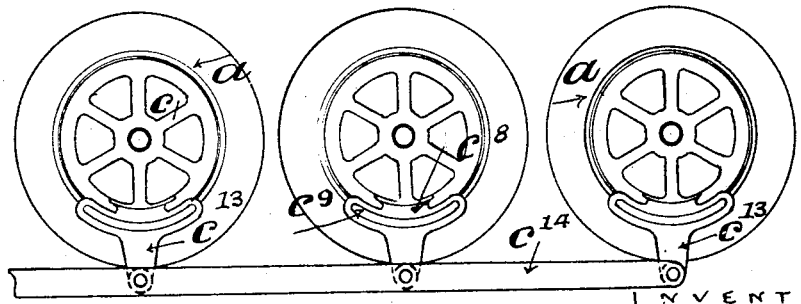

Patented Apr. 10, 1928.

1,665,850

UNITED STATES PATENT OFFICE.

WILLIAM HARGREAVES, OF WEST DIDSBURY, MANCHESTER, ENGLAND, ASSIGNOR OF ONE-HALF TO R. L. ROSS AND COMPANY LIMITED, OF STOCKPORT, ENGLAND.

SAFETY VALVE.

Application filed March 16, 1927, Serial No. 175,914, and in Great Britain April 6, 1926.

This invention concerns safety valves for steam generators and particularly for the boilers of locomotives. The valves might also be used with other vessels containing fluids under pressure.

In connection with safety valves for locomotives, valves of a low over-all height are extensively used and it is common to fit two valves, one auxiliary to the other; or in some cases three or four valves. With such a dual arrangement, owing to difficulties in exact or corresponding setting it is frequently found that one valve is apt to do all the work i. e. when the pressure is too high the same valve may always open. With the lapse of time, lack of attention and the accumulation of grit, dirt or foreign matter at the head of the valve less prone to open, it may be that such valve becomes made-up or further hampered so that when a real need for opening occurs, the laggard valve may be incapable of opening and this conceivably might have serious consequences.

My invention aims at a construction of valve or valves which are entirely independent, that is, valves separate and distinct the one from the other, and working in parallel either two or more and which complete independent valve structures are separate and distinct except as regards the interconnecting means and each valve has adjusting devices which are pre-set independently and relatively and have combined means operable from outside and which means after independent and relative adjustment of the valves can be cross-connected. The independent and relative setting and the cross-connecting is such that the valves can be set in alternate rotation or according to any sequence to move or yield in alternate rotation or according to any sequence to more readily open one against another, the one this week and the other next week or over any period. Supposing there be a combination of two valves A and B, then for the first week A can be set to open at a slightly lower pressure than B, whilst at the second week B is set to open at a slightly lower pressure than A is adjusted to and this by mere movement of the cross-connecting means. The mechanism used with each valve allows of an independent and relative adjustment up or down, say within a margin of 3 lbs. to the square inch or more or less.

If desired, the mechanism which provides for the differential adjustment of the valves in a series may be so fashioned and combined that after a particular setting no further adjustment can be made (save within the prescribed limits without taking the entire valve off the boiler or its seating; or by differently arranging the mechanism and its housing further adjustments may be made if such be desired. Such provision covers a foolproof and a non-foolproof combination.

In carrying out my invention I provide and combine with the safety valve or valves, mechanism working inside the valve casing which is capable of actuating some rotatable or movable part which shall augment or deduct from the pressure of the spring or load to ensure a periodical easier or harder opening of the safety valves relatively in any series. It is obvious that any simple operable gear or mechainsm, which can be housed in or in connection with the casing, and which will act on an inside part to influence the spring or load can be used and having means for actuation of same exterior to the casing. It is to be understood that in all cases the valves are independently set and then cross-connected so that the operating means do not affect the limit adjustment but only govern which valve shall blow first.

The mechanism used both interior and exterior for the purposes in view can be greatly varied, but in order to fully ascertain the scope of the invention I hereafter describe and show various structures, the same being fully illustrated in the attached drawings, wherein:—

Fig. 1 shows a sectional elevation of a "pop" type of safety valve and illustrates one arrangement for carrying my idea into practical effect.

Fig. 2 is a plan with the secondary area removed.

Figs. 3 and 4 are diagrams of outside operating means.

Figs. 5 and 6 show another arrangement in sectional elevation and plan.

Figs. 7, 8, and 9 and 10 show two alternative arrangements of locking device for the pinion with limited rotation.

Figs. 11 and 12 indicate a further arrangement.

Fig. 13 is a diagram of outside operating means for the construction Figs. 11 and 12.

Figs. 14, 15, 16 and 17 illustrate another scheme.

Figs. 18, 19 and 20 show a further construction.

Although I show, in the attached drawings, safety valves of the "pop" type having a low over-all height, it is to be understood my invention is not restricted thereto, but as I am employed by the makers of such valves it is convenient for me to illustrate the improvements in connection therewith.

Referring first to Figs. 1 to 4 the valve casing $a$ is shown fixed to a combining base $a'$ which carries the seat for the valve $b$. The head of the casing is screw-threaded internally and has an adjustable device $c$ which is also screw-threaded. The known secondary area is marked $d$. On the base of the adjustable device $c$ I cut bevel teeth $c'$ and I shape the casing to receive a small bevel wheel $e$, carried on a stud $e'$, fixed against undue end movement by a nut with split pin and seal, the stud $e'$ having a squared extremity $e^2$. In the small bevel wheel $e$ is fixed a plug $e^3$ which permits only a limited rotation (either way) of the small bevel wheel $e$, thus allowing of a slight release or augmentation of the pressure of the spring $f$ for the purposes related. As an alternative one or more teeth on the bevel wheel may be left uncut. The diagrams Figs. 3 and 4 simply indicate how several of the improved safety valves can be coupled together and show a series of three safety valves. In the example Fig. 3 the adjusting mechanisms have small lever arms $g$ applied, and a common connecting rod $g'$ couples them together. The threads on the adjustable devices $c$ in valves to be coupled in series are alternately right-and-left hand as will be obvious. By movement of the rod $g'$ any necessary relative adjustment is made and remains until a further setting of rod $g'$. Respecting Fig. 4, this is merely a different actuating scheme, a lever $g^2$ with "square" recesses in its boss coupling the squared ends $e^2$ of the studs $e'$ together, whilst the bevel pinion of the intermediate valve communicates motion to another small bevel pinion $e^4$ which by a coupling $e^5$ communicates motion to the small pinion $e$ of the third safety valve.

Turning to Figs. 5 and 6, the screw-threaded adjustable device $c$ is clearly shown and has bevel teeth $c'$. The small bevel pinion $e$ is applied along with and carried by a screwed removable plug $e^6$. This removable plug $e^6$ has a flange $e^7$ with holes to register with a hole in a lug $a'$ on the safety valve casing $a$ and the adjustment, once achieved, is maintained by an applied locking device such as $e^8$. A plug $e^3$ is shown to limit rotation of the small bevel pinion $e$, but, if desired, the small bevel pinion may be mutilated and a peg $e^9$ pushed into the removable boss $e^6$ carrying the bevel pinion and from inside, in order to limit rotation and the Figs. 9 and 10 illustrate this.

Instead of using a removable boss such as $e^6$ (Figs. 5 and 6) a removable pin $e^{10}$ with groove could be utilized the pin $e^{10}$ being secured by a padlock $e^8$ as the Figs. 7 and 8 show.

Figs. 11, 12 and 13 show the adjustable device $c$ as cut with worm teeth $c^3$ as well as being screw threaded, and these worm teeth are engaged by a worm $c^4$ housed in a shaped container $a^2$ of the casing $a$, and carried on a shaft $c^5$. Pendent from the adjustable device $c$ are fingers $c^6$, and a pin $c^7$, pushed into place from inside the casing $a$, prevents rotation exceeding the distance between any two pins $c^6$. If the shaft $c^5$ be actuated, it turns the worms $c^4$ in one direction or the other as is obvious and so adjusts the valves in the manner desired.

By Figs. 14, 15, 16 and 17, I indicate another construction wherein the adjustable device $c$ in addition to being screw threaded, is cut with teeth $f'$. With the teeth $f'$, gears a housed spur pinion $f^2$ mounted on a spindle $f^3$ which has a pendent extension $f^4$. A pin $f^5$ placed in position from the interior of the casing $a$, prevents the spindle $f^3$ from making a complete revolution. The adjustable device $c$ can thus be rotated to a limited extent. Lever arms $g^4$ on the squared ends of the spindles $f^3$ and a connecting rod $g^5$ serve as the setting means for a combination of valves, as indicated by Fig. 17.

In Figs. 18, 19 and 20 the screw-threaded adjustable device $c$ has a cranked extension $c^8$ quadrant shaped in plan and with a slot $c^9$. A vertical rod $c^{10}$ is housed in the casing $a$ and has a projecting extremity extending into the slot $c^9$ and limits movement of the cranked extension. The vertical rod $c^{10}$ is fixed by a pin $c^{11}$ applied from the inside of the casing $a$. The cranked extensions of two or more valves present lever arms $c^{13}$ (see Figs. 19 and 20) which can be coupled together by a connecting rod $c^{14}$, as Fig. 20 indicates, and such connecting rod can be moved according to the required setting as and when required.

Safety valves embodying my idea, that is, with predetermined alternating and restricted pre-setting, can be operated to a pre-determined and relative amount by adjusting the operating gear, so as to become automatically effective for the time being, once a setting has been made, irrespective of any manual operation or attention. No lock-nuts or safety washer or equivalent is requisite, as the adjusting mechanism is self-locking and restrictive within the required range.

The screw-threaded adjustable member $c$ is operated externally through the pre-determined movement, which movement cannot be exceeded without dismantling the valve, or alternatively unlocking a suitable locking device.

It is apparent that one valve only of the contemplated kind might be used in combination with a valve or valves of another construction, but in any such case it will be appreciated the new valve in the combination would be capable of adjustment from outside within strict limits up or down as and for the purposes already related.

I declare that what I claim is:

1. A device of the character described, comprising in combination, a series of safety valve units disposed for operation in parallel, means carried by each of said units and adjustable to hold its valve to its seat with variable pressure, each of said units being provided with enclosed non-tamperable means for independently and relatively adjusting said holding means and separately setting the valve units, means carried by each valve and operable from outside the valve for actuating its adjusting means, and means connecting the outside operable means of the individual valves thereby to permit alteration in the relative seating pressure of the individual valves.

2. A device of the character described, comprising in combination, a series of safety valve units disposed for operation in parallel, means carried by each of said units and adjustable to hold its valve to its seat with variable pressure, each of said units being provided with enclosed non-tamperable gearing for independently and relatively adjusting said holding means and separately setting the valve units, means for limiting said adjustment, means carried by each valve and operable from outside the valve for actuating said gearing, and means connecting the outside operable means of the individual valves thereby to permit alteration in the relative seating pressure of the individual valves.

3. A device of the character described, comprising in combination, a series of safety valve units disposed for operation in parallel, means carried by each of said units and adjustable to hold its valve to its seat with variable pressure, a shaft mounted for rotation in each of said valve casings, enclosed gearing between said shaft and adjustable holding means for operating the latter on the rotation of said shaft, said shaft being operable outside of the casing, and means for imparting simultaneous rotary motion to all of said shafts thereby to alter the relative seating pressure of the individual valves.

4. A device of the character described, comprising in combination, a series of safety valve units disposed for operation in parallel, means carried by each of said units and adjustable to hold its valve to its seat with variable pressure, a shaft mounted for rotation in each of said valve casings, enclosed gearing between said shaft and adjustable holding means for operating the latter on the rotation of said shaft, said shaft being operable outside of the casing, means for imparting simultaneous rotary motion to all of said shafts thereby to alter the relative seating pressure of the individual valves, and means carried by said gearing for limiting the rotation of said shaft.

In testimony whereof I have signed my name to this specification.

WILLIAM HARGREAVES.